US007436346B2

(12) United States Patent
Walter et al.

(10) Patent No.: US 7,436,346 B2
(45) Date of Patent: Oct. 14, 2008

(54) SYSTEM, METHOD AND INTERFACE FOR CONTROLLING MULTIPLE ELECTRONIC DEVICES OF A HOME ENTERTAINMENT SYSTEM VIA A SINGLE CONTROL DEVICE

(75) Inventors: Edward Walter, Boerne, TX (US); Yolius Diroo, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 226 days.

(21) Appl. No.: 11/037,951

(22) Filed: Jan. 20, 2005

(65) Prior Publication Data

US 2006/0158368 A1 Jul. 20, 2006

(51) Int. Cl.
*G08C 19/12* (2006.01)
*H04L 17/02* (2006.01)

(52) U.S. Cl. ........................ 341/176; 341/174; 341/175; 345/156; 348/552; 348/569

(58) Field of Classification Search ................. 341/176, 341/174, 175, 5.61, 5.64; 348/552, 569, 348/706, 731, 734; 345/156, 157
See application file for complete search history.

(56) References Cited

U.S. PATENT DOCUMENTS

| | | | |
|---|---|---|---|
| 4,243,147 | A | 1/1981 | Twitchell et al. |
| 4,356,509 | A | 10/1982 | Skerlos et al. |
| 4,768,926 | A | 9/1988 | Gilbert, Jr. |
| 4,907,079 | A | 3/1990 | Turner et al. |
| 5,126,731 | A | 6/1992 | Cromer, Jr. et al. |
| 5,163,340 | A | 11/1992 | Bender |
| 5,475,835 | A | 12/1995 | Hickey |

(Continued)

FOREIGN PATENT DOCUMENTS

| | | | |
|---|---|---|---|
| WO | WO 99/63759 | A2 | 12/1999 |

(Continued)

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.

(Continued)

*Primary Examiner*—Jeff Hofsass
*Assistant Examiner*—Sisay Yacob
(74) *Attorney, Agent, or Firm*—Toler Law Group

(57) ABSTRACT

A portable communication device is provided and includes a display. At least one remote control soft button is presented at the display and an electronic device control command is associated with each remote control soft button. Further, the electronic device control command is enabled in response to a code received at the portable communication device from a service provider. The portable communication device also includes a keypad that can be used to select the remote control soft button. Further, the electronic device control command is selected from the group consisting of: play, stop, pause, volume up, volume down, record, channel up, channel down, fast forward, and rewind. Additionally, the portable communication device includes a text input field and a send button that are presented at the display. The portable communication device selectively can control a selected remote electronic device using the at least one electronic device control command.

25 Claims, 5 Drawing Sheets

U.S. PATENT DOCUMENTS

| | | | | |
|---|---|---|---|---|
| 5,532,748 | A | 7/1996 | Naimpally | |
| 5,541,917 | A | 7/1996 | Farris | |
| 5,589,892 | A | 12/1996 | Knee et al. | |
| 5,592,477 | A | 1/1997 | Farris et al. | |
| 5,610,916 | A | 3/1997 | Kostreski et al. | |
| 5,613,012 | A | 3/1997 | Hoffman et al. | |
| 5,629,868 | A * | 5/1997 | Tessier et al. | 348/164 |
| 5,650,831 | A | 7/1997 | Farwell | |
| 5,651,332 | A | 7/1997 | Moore et al. | |
| 5,656,898 | A | 8/1997 | Kalina | |
| 5,675,390 | A | 10/1997 | Schindler et al. | |
| 5,708,961 | A | 1/1998 | Hylton et al. | |
| 5,722,041 | A | 2/1998 | Freadman | |
| 5,724,106 | A | 3/1998 | Autry et al. | |
| 5,729,825 | A | 3/1998 | Kostreski et al. | |
| 5,734,853 | A | 3/1998 | Hendricks et al. | |
| 5,774,357 | A | 6/1998 | Hoffberg et al. | |
| 5,793,438 | A | 8/1998 | Bedard | |
| 5,805,719 | A | 9/1998 | Pare, Jr. et al. | |
| 5,818,438 | A | 10/1998 | Howe et al. | |
| 5,838,384 | A | 11/1998 | Schindler et al. | |
| 5,838,812 | A | 11/1998 | Pare, Jr. et al. | |
| 5,864,757 | A | 1/1999 | Parker | |
| 5,867,223 | A | 2/1999 | Schindler et al. | |
| 5,892,508 | A | 4/1999 | Howe et al. | |
| 5,900,867 | A | 5/1999 | Schindler et al. | |
| 5,910,970 | A | 6/1999 | Lu | |
| 5,933,498 | A | 8/1999 | Schneck et al. | |
| 5,953,318 | A | 9/1999 | Nattkemper et al. | |
| 5,956,024 | A | 9/1999 | Strickland et al. | |
| 5,956,716 | A | 9/1999 | Kenner et al. | |
| 5,970,088 | A | 10/1999 | Chen | |
| 5,987,061 | A | 11/1999 | Chen | |
| 5,990,927 | A | 11/1999 | Hendricks et al. | |
| 5,995,155 | A | 11/1999 | Schindler et al. | |
| 5,999,518 | A | 12/1999 | Nattkemper et al. | |
| 5,999,563 | A | 12/1999 | Polley et al. | |
| 6,002,722 | A | 12/1999 | Wu | |
| 6,014,184 | A | 1/2000 | Knee et al. | |
| 6,021,158 | A | 2/2000 | Schurr et al. | |
| 6,021,167 | A | 2/2000 | Wu | |
| 6,028,600 | A | 2/2000 | Rosin et al. | |
| 6,029,045 | A | 2/2000 | Picco et al. | |
| 6,038,251 | A | 3/2000 | Chen | |
| 6,044,107 | A | 3/2000 | Gatherer et al. | |
| 6,052,120 | A | 4/2000 | Nahi et al. | |
| 6,055,268 | A | 4/2000 | Timm et al. | |
| 6,072,483 | A | 6/2000 | Rosin et al. | |
| 6,084,584 | A | 7/2000 | Nahi et al. | |
| 6,111,582 | A | 8/2000 | Jenkins | |
| 6,118,498 | A | 9/2000 | Reitmeier | |
| 6,122,660 | A | 9/2000 | Baransky et al. | |
| 6,124,799 | A | 9/2000 | Parker | |
| 6,127,941 | A * | 10/2000 | Van Ryzin | 340/825.69 |
| 6,137,839 | A | 10/2000 | Mannering et al. | |
| 6,166,734 | A | 12/2000 | Nahi et al. | |
| 6,181,335 | B1 | 1/2001 | Hendricks et al. | |
| 6,192,282 | B1 | 2/2001 | Smith et al. | |
| 6,195,692 | B1 | 2/2001 | Hsu | |
| 6,215,483 | B1 | 4/2001 | Zigmond | |
| 6,237,022 | B1 | 5/2001 | Bruck et al. | |
| 6,243,366 | B1 | 6/2001 | Bradley et al. | |
| 6,252,588 | B1 | 6/2001 | Dawson | |
| 6,252,989 | B1 | 6/2001 | Geisler et al. | |
| 6,260,192 | B1 | 7/2001 | Rosin et al. | |
| 6,269,394 | B1 | 7/2001 | Kenner et al. | |
| 6,275,268 | B1 | 8/2001 | Ellis et al. | |
| 6,275,989 | B1 | 8/2001 | Broadwin et al. | |
| 6,281,813 | B1 | 8/2001 | Vierthaler et al. | |
| 6,286,142 | B1 | 9/2001 | Ehreth | |
| 6,295,057 | B1 | 9/2001 | Rosin et al. | |
| 6,311,214 | B1 | 10/2001 | Rhoads | |
| 6,314,409 | B2 | 11/2001 | Schneck et al. | |
| 6,344,882 | B1 | 2/2002 | Shim et al. | |
| 6,357,043 | B1 | 3/2002 | Ellis et al. | |
| 6,359,636 | B1 | 3/2002 | Schindler et al. | |
| 6,363,149 | B1 | 3/2002 | Candelore | |
| 6,385,693 | B1 | 5/2002 | Gerszberg et al. | |
| 6,396,480 | B1 | 5/2002 | Schindler et al. | |
| 6,396,531 | B1 | 5/2002 | Gerszberg et al. | |
| 6,396,544 | B1 | 5/2002 | Schindler et al. | |
| 6,397,387 | B1 | 5/2002 | Rosin et al. | |
| 6,400,407 | B1 | 6/2002 | Zigmond et al. | |
| 6,411,307 | B1 | 6/2002 | Rosin et al. | |
| 6,442,285 | B2 | 8/2002 | Rhoads et al. | |
| 6,442,549 | B1 | 8/2002 | Schneider | |
| 6,449,601 | B1 | 9/2002 | Freidland et al. | |
| 6,450,407 | B1 | 9/2002 | Freeman et al. | |
| 6,460,075 | B2 | 10/2002 | Krueger et al. | |
| 6,463,585 | B1 | 10/2002 | Hendricks et al. | |
| 6,481,011 | B1 | 11/2002 | Lemmons | |
| 6,486,892 | B1 | 11/2002 | Stern | |
| 6,492,913 | B2 | 12/2002 | Vierthaler et al. | |
| 6,496,983 | B1 | 12/2002 | Schindler et al. | |
| 6,502,242 | B1 | 12/2002 | Howe et al. | |
| 6,505,348 | B1 | 1/2003 | Knowles et al. | |
| 6,510,519 | B2 | 1/2003 | Wasilewski et al. | |
| 6,515,680 | B1 | 2/2003 | Hendricks et al. | |
| 6,516,467 | B1 | 2/2003 | Schindler et al. | |
| 6,519,011 | B1 | 2/2003 | Shendar | |
| 6,522,769 | B1 | 2/2003 | Rhoads et al. | |
| 6,526,577 | B1 | 2/2003 | Knudson et al. | |
| 6,529,949 | B1 | 3/2003 | Getsin et al. | |
| 6,535,590 | B2 | 3/2003 | Tidwell et al. | |
| 6,538,704 | B1 | 3/2003 | Grabb et al. | |
| 6,542,740 | B1 | 4/2003 | Olgaard et al. | |
| 6,557,030 | B1 | 4/2003 | Hoang | |
| 6,567,982 | B1 | 5/2003 | Howe et al. | |
| 6,587,873 | B1 | 7/2003 | Nobakht et al. | |
| 6,598,231 | B1 | 7/2003 | Basawapatna et al. | |
| 6,599,199 | B1 | 7/2003 | Hapshie | |
| 6,607,136 | B1 | 8/2003 | Atsmon et al. | |
| 6,609,253 | B1 | 8/2003 | Swix et al. | |
| 6,611,537 | B1 | 8/2003 | Edens et al. | |
| 6,614,987 | B1 | 9/2003 | Ismail et al. | |
| 6,622,148 | B1 | 9/2003 | Noble et al. | |
| 6,622,307 | B1 | 9/2003 | Ho | |
| 6,631,523 | B1 | 10/2003 | Matthews, III et al. | |
| 6,640,239 | B1 | 10/2003 | Gidwani | |
| 6,643,495 | B1 | 11/2003 | Gallery et al. | |
| 6,643,684 | B1 | 11/2003 | Malkin et al. | |
| 6,650,761 | B1 | 11/2003 | Rodriguez et al. | |
| 6,658,568 | B1 | 12/2003 | Ginter et al. | |
| 6,678,215 | B1 | 1/2004 | Treyz et al. | |
| 6,678,733 | B1 | 1/2004 | Brown et al. | |
| 6,690,392 | B1 | 2/2004 | Wugoski | |
| 6,693,236 | B1 | 2/2004 | Gould et al. | |
| 6,701,523 | B1 | 3/2004 | Hancock et al. | |
| 6,704,931 | B1 | 3/2004 | Schaffer et al. | |
| 6,714,264 | B1 | 3/2004 | Kempisty | |
| 6,725,281 | B1 | 4/2004 | Zintel et al. | |
| 6,731,393 | B1 | 5/2004 | Currans et al. | |
| 6,732,179 | B1 | 5/2004 | Brown et al. | |
| 6,745,223 | B1 | 6/2004 | Nobakht et al. | |
| 6,745,392 | B1 | 6/2004 | Basawapatna et al. | |
| 6,754,206 | B1 | 6/2004 | Nattkemper et al. | |
| 6,756,997 | B1 | 6/2004 | Ward, III et al. | |
| 6,760,918 | B2 | 7/2004 | Rodriguez et al. | |
| 6,763,226 | B1 | 7/2004 | McZeal, Jr. | |
| 6,765,557 | B1 | 7/2004 | Segal et al. | |
| 6,766,305 | B1 | 7/2004 | Fucarile et al. | |
| 6,769,128 | B1 | 7/2004 | Knee et al. | |
| 6,771,317 | B2 | 8/2004 | Ellis et al. | |
| 6,773,344 | B1 | 8/2004 | Gabai et al. | |

| | | | | |
|---|---|---|---|---|
| 6,778,559 | B2 | 8/2004 | Hyakutake | |
| 6,779,004 | B1 | 8/2004 | Zintel | |
| 6,781,518 | B1 | 8/2004 | Hayes et al. | |
| 6,784,804 | B1 | 8/2004 | Hayes et al. | |
| 6,785,716 | B1 | 8/2004 | Nobakht | |
| 6,788,709 | B1 | 9/2004 | Hyakutake | |
| 6,791,467 | B1 * | 9/2004 | Ben-Ze'ev | 340/825.69 |
| 6,804,824 | B1 | 10/2004 | Potrebic et al. | |
| 6,826,775 | B1 | 11/2004 | Howe et al. | |
| 6,828,993 | B1 | 12/2004 | Hendricks et al. | |
| 6,909,874 | B2 | 6/2005 | Holtz et al. | |
| 6,938,021 | B2 | 8/2005 | Shear et al. | |
| 6,947,101 | B2 * | 9/2005 | Arling | 348/734 |
| 2001/0011261 | A1 | 8/2001 | Mullen-Schultz | |
| 2001/0016945 | A1 | 8/2001 | Inoue | |
| 2001/0016946 | A1 | 8/2001 | Inoue | |
| 2001/0034664 | A1 | 10/2001 | Brunson | |
| 2001/0044794 | A1 | 11/2001 | Nasr et al. | |
| 2001/0048677 | A1 | 12/2001 | Boys | |
| 2001/0049826 | A1 | 12/2001 | Wilf | |
| 2001/0054008 | A1 | 12/2001 | Miller et al. | |
| 2001/0054009 | A1 | 12/2001 | Miller et al. | |
| 2001/0054067 | A1 | 12/2001 | Miller et al. | |
| 2001/0056350 | A1 | 12/2001 | Calderone et al. | |
| 2002/0001303 | A1 | 1/2002 | Boys | |
| 2002/0001310 | A1 | 1/2002 | Mai et al. | |
| 2002/0002496 | A1 | 1/2002 | Miller et al. | |
| 2002/0003166 | A1 | 1/2002 | Miller et al. | |
| 2002/0007307 | A1 | 1/2002 | Miller et al. | |
| 2002/0007313 | A1 | 1/2002 | Mai et al. | |
| 2002/0007485 | A1 | 1/2002 | Rodriguez et al. | |
| 2002/0010639 | A1 | 1/2002 | Howey et al. | |
| 2002/0010745 | A1 | 1/2002 | Schneider | |
| 2002/0010935 | A1 | 1/2002 | Sitnik | |
| 2002/0016736 | A1 | 2/2002 | Cannon et al. | |
| 2002/0022963 | A1 | 2/2002 | Miller et al. | |
| 2002/0022970 | A1 | 2/2002 | Noll et al. | |
| 2002/0022992 | A1 | 2/2002 | Miller et al. | |
| 2002/0022993 | A1 | 2/2002 | Miller et al. | |
| 2002/0022994 | A1 | 2/2002 | Miller et al. | |
| 2002/0022995 | A1 | 2/2002 | Miller et al. | |
| 2002/0023959 | A1 | 2/2002 | Miller et al. | |
| 2002/0026357 | A1 | 2/2002 | Miller et al. | |
| 2002/0026358 | A1 | 2/2002 | Miller et al. | |
| 2002/0026369 | A1 | 2/2002 | Miller et al. | |
| 2002/0026475 | A1 | 2/2002 | Marmor | |
| 2002/0029181 | A1 | 3/2002 | Miller et al. | |
| 2002/0030105 | A1 | 3/2002 | Miller et al. | |
| 2002/0032603 | A1 | 3/2002 | Yeiser | |
| 2002/0035404 | A1 | 3/2002 | Ficco et al. | |
| 2002/0040475 | A1 | 4/2002 | Yap et al. | |
| 2002/0042915 | A1 | 4/2002 | Kubischta et al. | |
| 2002/0046093 | A1 | 4/2002 | Miller et al. | |
| 2002/0049635 | A1 | 4/2002 | Mai et al. | |
| 2002/0054087 | A1 | 5/2002 | Noll et al. | |
| 2002/0054750 | A1 | 5/2002 | Ficco et al. | |
| 2002/0059163 | A1 | 5/2002 | Smith | |
| 2002/0059218 | A1 * | 5/2002 | August et al. | 707/5 |
| 2002/0059425 | A1 | 5/2002 | Belfiore et al. | |
| 2002/0059599 | A1 | 5/2002 | Schein et al. | |
| 2002/0065717 | A1 | 5/2002 | Miller et al. | |
| 2002/0067438 | A1 | 6/2002 | Baldock | |
| 2002/0069220 | A1 | 6/2002 | Tran | |
| 2002/0069282 | A1 | 6/2002 | Reisman | |
| 2002/0069294 | A1 | 6/2002 | Herkersdorf et al. | |
| 2002/0072970 | A1 | 6/2002 | Miller et al. | |
| 2002/0078442 | A1 | 6/2002 | Reyes et al. | |
| 2002/0097261 | A1 | 7/2002 | Gottfurcht et al. | |
| 2002/0106119 | A1 | 8/2002 | Foran et al. | |
| 2002/0112239 | A1 | 8/2002 | Goldman | |
| 2002/0116392 | A1 | 8/2002 | McGrath et al. | |
| 2002/0124055 | A1 | 9/2002 | Reisman | |
| 2002/0128061 | A1 | 9/2002 | Blanco | |
| 2002/0129094 | A1 | 9/2002 | Reisman | |
| 2002/0133402 | A1 | 9/2002 | Faber et al. | |
| 2002/0138840 | A1 | 9/2002 | Schein et al. | |
| 2002/0151327 | A1 * | 10/2002 | Levitt | 455/556 |
| 2002/0152264 | A1 | 10/2002 | Yamasaki | |
| 2002/0169611 | A1 | 11/2002 | Guerra et al. | |
| 2002/0170063 | A1 | 11/2002 | Ansari et al. | |
| 2002/0173344 | A1 | 11/2002 | Cupps et al. | |
| 2002/0188955 | A1 | 12/2002 | Thompson et al. | |
| 2002/0193997 | A1 | 12/2002 | Fitzpatrick et al. | |
| 2002/0194601 | A1 | 12/2002 | Perkes et al. | |
| 2002/0198874 | A1 | 12/2002 | Nasr et al. | |
| 2003/0005445 | A1 | 1/2003 | Schein et al. | |
| 2003/0009771 | A1 | 1/2003 | Chang | |
| 2003/0012365 | A1 | 1/2003 | Goodman | |
| 2003/0014750 | A1 | 1/2003 | Kamen | |
| 2003/0018975 | A1 | 1/2003 | Stone | |
| 2003/0023435 | A1 | 1/2003 | Josephson | |
| 2003/0023440 | A1 | 1/2003 | Chu | |
| 2003/0028890 | A1 | 2/2003 | Swart et al. | |
| 2003/0033416 | A1 | 2/2003 | Schwartz | |
| 2003/0043915 | A1 | 3/2003 | Costa et al. | |
| 2003/0046091 | A1 | 3/2003 | Arneson et al. | |
| 2003/0046689 | A1 | 3/2003 | Gaos | |
| 2003/0056223 | A1 | 3/2003 | Costa et al. | |
| 2003/0058277 | A1 | 3/2003 | Bowman-Amuah | |
| 2003/0061611 | A1 | 3/2003 | Pendakur | |
| 2003/0071792 | A1 | 4/2003 | Safadi | |
| 2003/0093793 | A1 | 5/2003 | Gutta | |
| 2003/0095211 | A1 * | 5/2003 | Nakajima | 348/734 |
| 2003/0100340 | A1 | 5/2003 | Cupps et al. | |
| 2003/0110161 | A1 | 6/2003 | Schneider | |
| 2003/0110503 | A1 | 6/2003 | Perkes | |
| 2003/0122698 | A1 * | 7/2003 | Horie et al. | 341/176 |
| 2003/0126136 | A1 | 7/2003 | Omoigui | |
| 2003/0135771 | A1 | 7/2003 | Cupps et al. | |
| 2003/0141987 | A1 | 7/2003 | Hayes | |
| 2003/0145321 | A1 | 7/2003 | Bates et al. | |
| 2003/0149989 | A1 | 8/2003 | Hunter et al. | |
| 2003/0153353 | A1 | 8/2003 | Cupps et al. | |
| 2003/0153354 | A1 | 8/2003 | Cupps et al. | |
| 2003/0159026 | A1 | 8/2003 | Cupps et al. | |
| 2003/0160830 | A1 | 8/2003 | DeGross | |
| 2003/0163601 | A1 | 8/2003 | Cupps et al. | |
| 2003/0163666 | A1 | 8/2003 | Cupps et al. | |
| 2003/0171127 | A1 * | 9/2003 | White | 455/462 |
| 2003/0172380 | A1 | 9/2003 | Kikinis | |
| 2003/0182237 | A1 | 9/2003 | Costa et al. | |
| 2003/0182420 | A1 | 9/2003 | Jones et al. | |
| 2003/0185232 | A1 | 10/2003 | Moore et al. | |
| 2003/0187641 | A1 | 10/2003 | Moore et al. | |
| 2003/0187646 | A1 | 10/2003 | Smyers et al. | |
| 2003/0187800 | A1 | 10/2003 | Moore et al. | |
| 2003/0189509 | A1 | 10/2003 | Hayes et al. | |
| 2003/0189589 | A1 | 10/2003 | LeBlanc et al. | |
| 2003/0194141 | A1 | 10/2003 | Kortum et al. | |
| 2003/0194142 | A1 | 10/2003 | Kortum et al. | |
| 2003/0208396 | A1 | 11/2003 | Miller et al. | |
| 2003/0208758 | A1 | 11/2003 | Schein et al. | |
| 2003/0220881 | A1 * | 11/2003 | Pirhonen et al. | 705/53 |
| 2003/0226044 | A1 | 12/2003 | Cupps et al. | |
| 2003/0226145 | A1 | 12/2003 | Marsh | |
| 2003/0229900 | A1 | 12/2003 | Reisman | |
| 2004/0003041 | A1 | 1/2004 | Moore et al. | |
| 2004/0003403 | A1 | 1/2004 | Marsh | |
| 2004/0006769 | A1 | 1/2004 | Ansari et al. | |
| 2004/0006772 | A1 | 1/2004 | Ansari et al. | |
| 2004/0010602 | A1 | 1/2004 | Van Vleck et al. | |
| 2004/0015997 | A1 | 1/2004 | Ansari et al. | |
| 2004/0030750 | A1 | 2/2004 | Moore et al. | |
| 2004/0031058 | A1 | 2/2004 | Reisman | |
| 2004/0031856 | A1 | 2/2004 | Atsmon et al. | |
| 2004/0034877 | A1 | 2/2004 | Nogues | |

2004/0049728 A1 3/2004 Langford
2004/0064351 A1 4/2004 Mikurak
2004/0068740 A1 4/2004 Fukuda et al.
2004/0068753 A1 4/2004 Robertson et al.
2004/0070491 A1 4/2004 Huang et al.
2004/0073918 A1 4/2004 Ferman et al.
2004/0098571 A1 5/2004 Falcon
2004/0107125 A1 6/2004 Guheen et al.
2004/0107439 A1 6/2004 Hassell et al.
2004/0111745 A1 6/2004 Schein et al.
2004/0111756 A1 6/2004 Stuckman et al.
2004/0117813 A1 6/2004 Karaoguz et al.
2004/0117824 A1 6/2004 Karaoguz et al.
2004/0128342 A1 7/2004 Maes et al.
2004/0139173 A1 7/2004 Karaoguz et al.
2004/0143600 A1 7/2004 Musgrove et al.
2004/0143652 A1 7/2004 Grannan et al.
2004/0148408 A1 7/2004 Nadarajah
2004/0150676 A1 8/2004 Gottfurcht et al.
2004/0183839 A1 9/2004 Gottfurcht et al.
2004/0194136 A1 9/2004 Finseth et al.
2004/0198386 A1 10/2004 Dupray
2004/0201600 A1 10/2004 Kakivaya et al.
2004/0207765 A1* 10/2004 Ku et al. ..................... 348/734
2004/0210633 A1 10/2004 Brown et al.
2004/0210935 A1 10/2004 Schein et al.
2004/0213271 A1 10/2004 Lovy et al.
2004/0221302 A1 11/2004 Ansari et al.
2004/0223485 A1 11/2004 Arellano et al.
2004/0226035 A1 11/2004 Hauser, Jr.
2004/0226045 A1 11/2004 Nadarajah
2004/0239624 A1 12/2004 Ramian
2004/0252119 A1 12/2004 Hunleth et al.
2004/0252120 A1 12/2004 Hunleth et al.
2004/0252769 A1 12/2004 Costa et al.
2004/0252770 A1 12/2004 Costa et al.
2004/0259537 A1* 12/2004 Ackley ....................... 455/420
2004/0260407 A1 12/2004 Wimsatt
2004/0261116 A1 12/2004 McKeown et al.
2004/0267729 A1 12/2004 Swaminathan et al.
2004/0268393 A1 12/2004 Hunleth et al.
2005/0027851 A1 2/2005 McKeown et al.
2005/0038814 A1 2/2005 Iyengar et al.
2005/0044280 A1 2/2005 Reisman
2005/0062637 A1* 3/2005 El Zabadani et al. ........ 341/176
2005/0097612 A1 5/2005 Pearson et al.
2005/0132295 A1 6/2005 Noll et al.
2005/0149328 A1* 7/2005 Huang et al. ................ 704/252
2005/0195961 A1 9/2005 Pasquale et al.

FOREIGN PATENT DOCUMENTS

WO WO 00/28689 A2 5/2000
WO WO 01/60066 A1 8/2001
WO WO 02/17627 A2 2/2002
WO WO 02/058382 A1 7/2002
WO WO 03/003710 A2 1/2003
WO WO 03/025726 A1 3/2003
WO WO 2004/018060 A2 3/2004
WO WO 2004/032514 A1 4/2004
WO WO 2004/062279 A1 7/2004
WO WO 2005/045554 A2 5/2005

OTHER PUBLICATIONS

U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/148,967, filed Jun. 9, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.

* cited by examiner

SYSTEM, METHOD AND INTERFACE FOR CONTROLLING MULTIPLE ELECTRONIC DEVICES OF A HOME ENTERTAINMENT SYSTEM VIA A SINGLE CONTROL DEVICE

FIELD OF THE DISCLOSURE

The present disclosure relates to home entertainment systems.

BACKGROUND

A home entertainment can include multiple electronic components. For example, a home entertainment system can include a compact disc (CD) player, a digital video disc (DVD) player, an audio receiver, a set top box, and a television. Further, the home entertainment system can include multiple speakers, e.g., two front speakers, two rear speakers, and a center speaker. Typically, each electronic component includes a remote control device that can be used to control the electronic component and each time a user wants to control a particular electronic component he or she must locate the remote for that device.

Universal remote control devices have been provided and a single universal remote control device can be used to multiple electronic components. In order to use the universal remote control device to control multiple electronic components, a code associated with each electronic component must be input to the universal remote control device in order to "unlock" the controls for each electronic component at the universal remote control device. Often, the only way to unlock the controls for a particular electronic component is to know the code associated with the electronic component and manually input the code to the electronic component. If the code is unknown, the controls for the electronic component cannot be unlocked and the electronic component cannot be controlled with the universal remote control device.

Accordingly, there is a need for an improved method of controlling multiple electronic devices of a home entertainment system.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A portable communication device is provided and includes a display. At least one remote control soft button is presented at the display and an electronic device control command is associated with each remote control soft button. Further, the electronic device control command is enabled in response to a code received at the portable communication device from a service provider.

In a particular embodiment, the portable communication device also includes a keypad that can be used to select the remote control soft button. Further, in a particular embodiment, the electronic device control command is selected from the group consisting of: play, stop, pause, volume up, volume down, record, channel up, channel down, fast forward, and rewind.

Also, in a particular embodiment, the portable communication device includes a text input field and a send button that are presented at the display. In a particular embodiment, the portable communication device selectively can control a selected remote electronic device using the at least one electronic device control command. The selected remote electronic device can be selected from the group consisting of: a digital video disc player, a compact disc player, a television, an MP3 player, an audio receiver, and a set top box.

In a particular embodiment, the portable communication device further includes a radio frequency transceiver and the portable communication device communicates the electronic device control command to the selected electronic device via the radio frequency transceiver. Additionally, the portable communication device can include an infrared transceiver and the portable communication device can communicate the electronic device control command to the selected electronic device via the infrared transceiver. Moreover, the portable communication device can include a short message system module and the portable communication device can communicate the electronic device control command to the selected electronic device via the short message system module.

In another embodiment, a method of controlling a remote electronic device is provided and includes receiving a selection of the remote electronic device at a portable communication device. Thereafter, the portable communication device determines whether a control interface that corresponds to the electronic device is enabled at the portable communication device. If not, the portable communication device transmits a request to a service provider for a code associated with activating the control interface.

In yet another embodiment, a user interface that is displayed on a display area of a portable communication device is provided and includes a list of electronic devices that are remotely controllable via the portable communication device.

Figure 1:
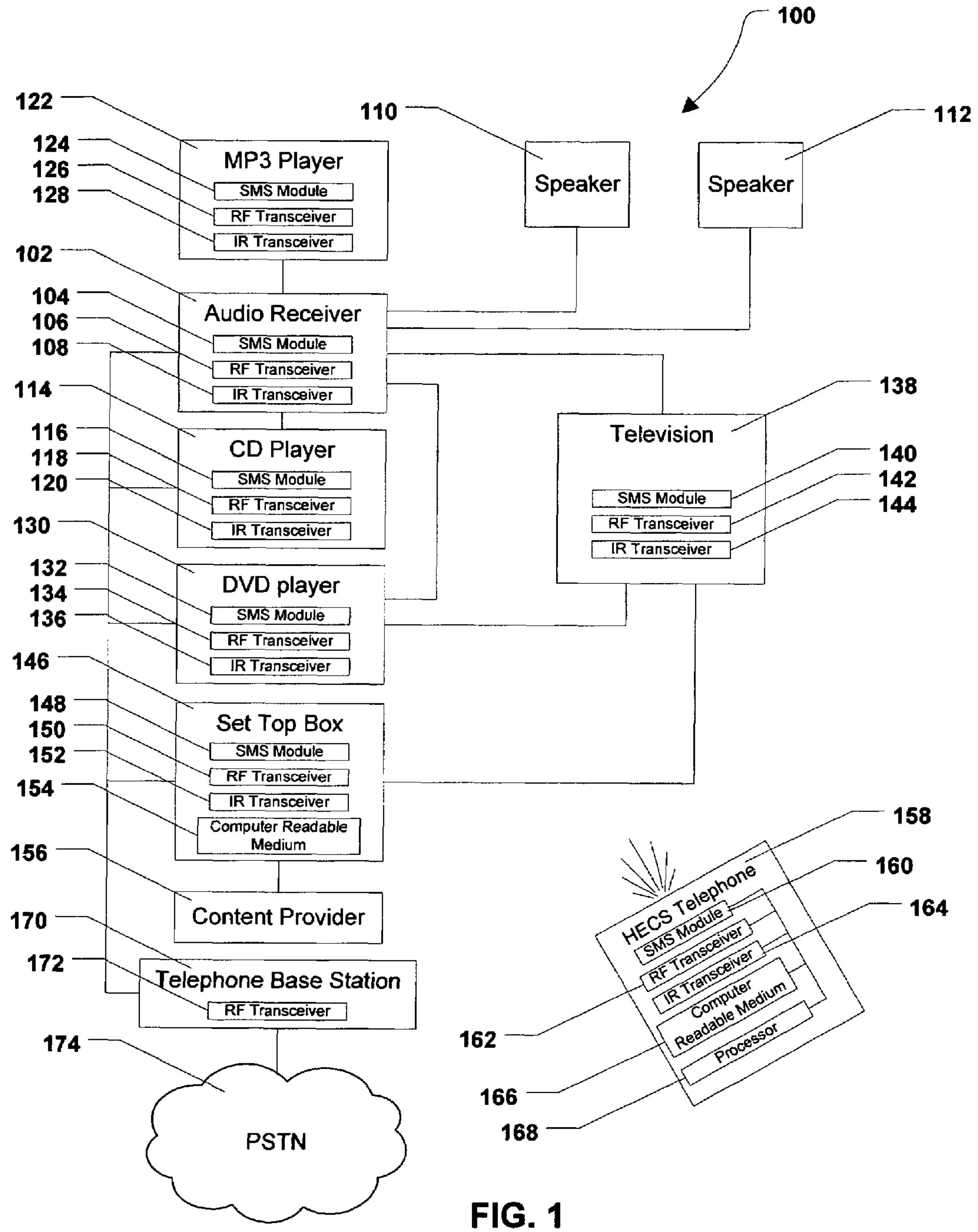
FIG. 1 is a block diagram representative of a home entertainment system.

Referring to FIG. 1, a home entertainment system is illustrated and is generally designated 100. As depicted in FIG. 1, the home entertainment system 100 includes an audio receiver 102. In a particular embodiment, the audio receiver 102 can include a short message service (SMS) module 104 that can be used to receive text messages from a remote control device. In a particular embodiment, the text messages received by the SMS module 104 within the audio receiver 102 can related to an electronic device control, such as "ON," "OFF," "CHANNEL UP," "CHANNEL DOWN," etc. As shown in FIG. 1, the audio receiver 102 can also include a radio frequency (RF) transceiver 106 and an infrared (IR) transceiver 108. In a particular embodiment, the audio receiver 102 can respond to RF signals and IR signals received from a control device via the RF transceiver 106 and the IR transceiver 108. FIG. 1 further shows a first speaker 110 and a second speaker 112 that are coupled to the audio receiver 102.

As shown in FIG. 1, a compact disc (CD) player 114 can be coupled to the audio receiver 102. In a particular embodiment, the CD player 114 can include an SMS module 116, an RF transceiver 118, and an IR transceiver 120. Further, in a particular embodiment, the CD player 114 can be controlled by text messages received via the SMS module 116, by RF signals received via the RF transceiver 118, or by IR signals received via the IR transceiver 120.

FIG. 1 further indicates that an MP3 player 122 can also be coupled to the audio receiver 102. In a particular embodiment, the MP3 player 122 can include an SMS module 124, an RF transceiver 126, and an IR transceiver 128. Additionally, the MP3 player 122 can be controlled by text messages received via the SMS module 124, by RF signals received via the RF transceiver 126, or by IR signals received via the IR transceiver 128. As shown in FIG. 1, a digital video disc (DVD) player 130 can also be coupled to the audio receiver 102. The DVD player 130 can include an SMS module 132, an RF transceiver 134, and an IR transceiver 136. Also, the DVD player 130 can be controlled by text messages received via the SMS module 132, by RF signals received via the RF transceiver 134, or by IR signals received via the IR transceiver 136.

FIG. 1 also shows that a television 138 can be coupled to the audio receiver 102 and to the DVD player 130. In an illustrative embodiment, the television 138 can also include an SMS module 140, an RF transceiver 142, and an IR transceiver 144. The television 138 can be controlled by text messages received via the SMS module 140, by RF signals received via the RF transceiver 142, or by IR signals received via the IR transceiver 144. As further depicted in FIG. 1, a set top box 146 can also be coupled to the audio receiver 102 and to the television 138. As shown, the set top box 146 can include an SMS module 148, an RF transceiver 150, and an IR transceiver 152. In a particular embodiment, the set top box 146 can be controlled by text messages received via the SMS module 148, by RF signals received via the RF transceiver 150, or by IR signals received via the IR transceiver 152. In a particular embodiment, the set top box 146 can further include a computer readable medium 154, such as a memory device.

As illustrated in FIG. 1, the set top box 146 can be coupled to a content provider 156. For example, the set top box 146 can be coupled to the content provider 156 via a broadband cable connection. FIG. 1 further shows that the home entertainment system 100 can include a home entertainment control system (HECS) telephone 158. As shown, the HECS telephone 158 can also include an SMS module 160, an RF transceiver 162, and an IR transceiver 164. Further, the HECS telephone 158 can include a computer readable medium 166, e.g., a memory device, and a processor 168 that is coupled to the computer readable medium 166, the IR transceiver 164, the RF transceiver 162, and the SMS module 160.

In a particular embodiment, the HECS telephone 158 can be used to transmit text messages, RF signals, and IR signals. Accordingly, in an exemplary, non-limiting embodiment, the HECS telephone 158 can be used as a single remote control device for controlling the audio receiver 102, the CD player 114, the MP3 player 122, the DVD player 130, the television 138, and the set top box 146. Further, the HECS telephone 158 can be used as a cordless telephone.

FIG. 1 also shows a telephone base station 170. In a particular embodiment, the telephone base station 170 includes an RF transceiver 172 and can receive RF signals from the HECS telephone 158. The RF signals from the HECS telephone can carry voice data or text message data to the base station 170. The base station 170 can transmit the voice data or the text message data to a public switched telephone network (PSTN) 174 that is coupled to the telephone base station 170. Additionally, in an exemplary embodiment, the telephone base station 170 can be used to charge the HECS telephone 158 when the HECS telephone 158 is cradled in the telephone base station 170.

Figure 2:
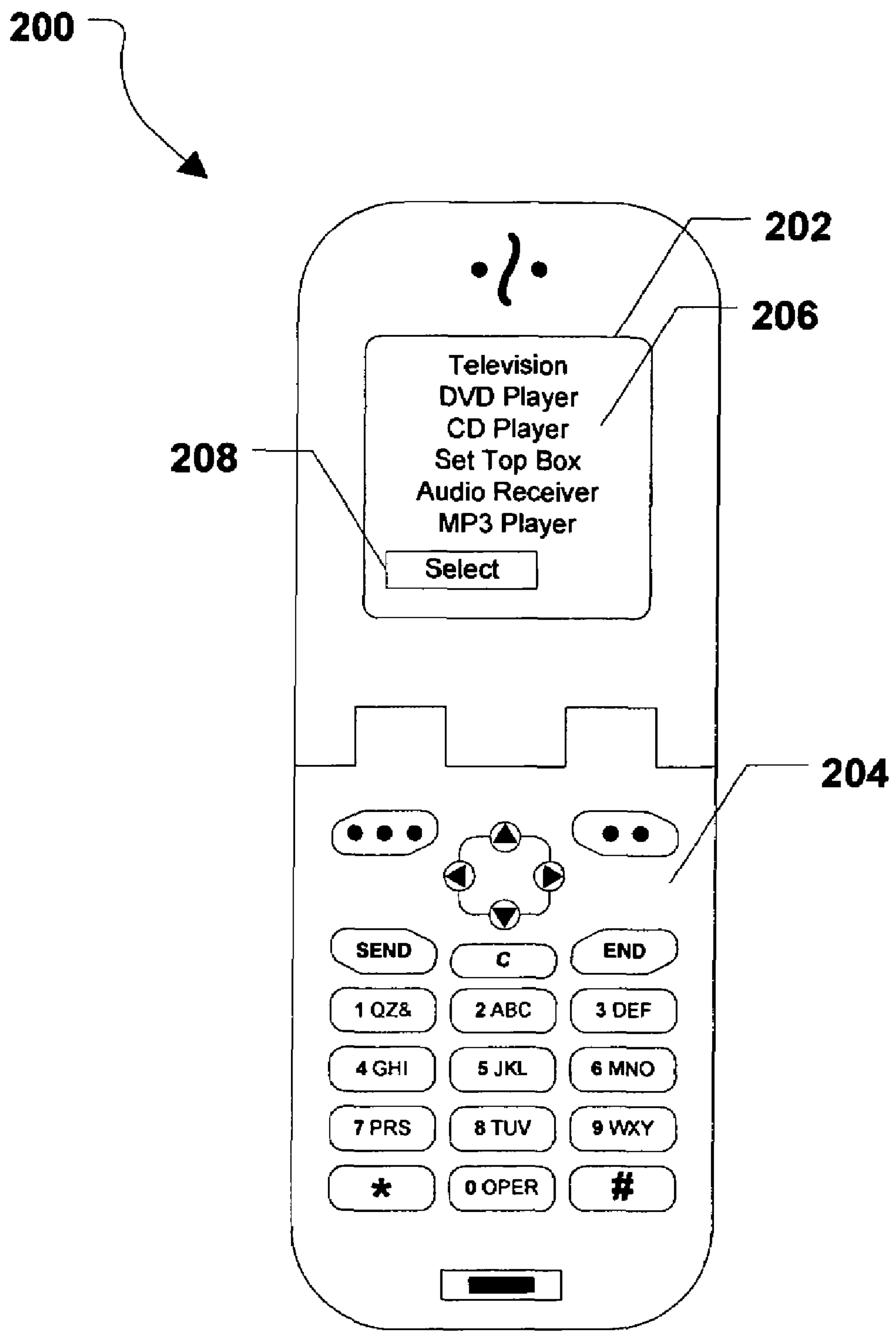
FIG. 2 is a general diagram of a home entertainment control system telephone with a first embodiment of a user interface.

Referring to FIG. 2, an exemplary, non-limiting, detailed embodiment of an HECS telephone is shown and is generally designated 200. As depicted in FIG. 2, the HECS telephone is a portable computing device that includes a display 202 and a keypad 204. A device selection menu 206 can be presented to a user via the display 202. In a particular embodiment, the device selection menu 206 can include a listing of devices that are controllable by the HECS telephone 200. For example, the device selection menu 206 can include: "Television," "DVD Player," "CD Player," "Set Top Box," "Audio Receiver," and "MP3 Player." A user can scroll through the device selection menu 206 using the keypad 204 and then, using the keypad 204 or a soft button 208 that is labeled "Select," select a particular device to control using the HECS telephone 200.

Figure 3:
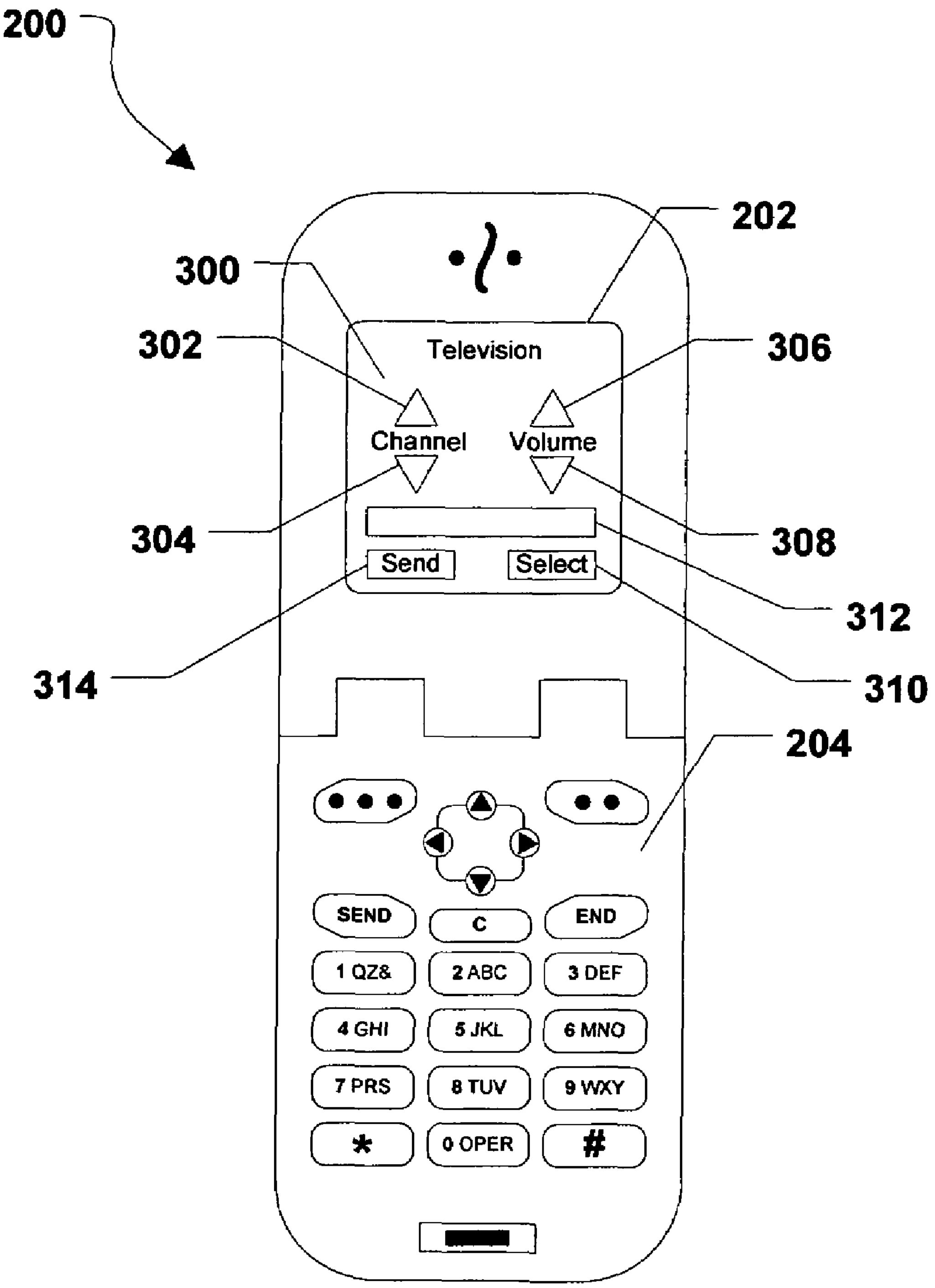
FIG. 3 is a general diagram of a home entertainment control system telephone with a second embodiment of a user interface.

FIG. 3 shows a Television Control Interface, designated 300, that can be displayed at the HECS telephone 200 after Television is selected at the device selection menu 206, shown in FIG. 2. As shown, the Television Control Interface 300 can include a channel up button 302 and a channel down button 304 that can be used to move between channels provided by a television. Further, the Television Control Interface 300 can include a volume up button 306 and a volume down button 308 that can be used to control the volume of the television via the HECS telephone 200.

In an illustrative embodiment, a user can scroll through the control buttons 302, 304, 306, 308 using the keypad 204 and then, using the keypad 204 or a soft button 310 that is labeled "Select," select a particular control button 302, 304, 306, 308 in order to send a command associated with the particular control button 302, 304, 306, 308 from the HECS telephone 200 to a television in wireless communication with the HECS telephone 200. FIG. 3 also shows that the Television Control Interface 300 can include a text input field 312 and a send button 314. In a particular embodiment, a user can input a text control message to the text input field 312 using the keypad 204 and then, toggle the send button 314 in order to send a control message to the television. In an exemplary embodiment, control commands can be sent from the HECS telephone 200 to the television via RF signals, IR signals, or text messages.

Figure 4:
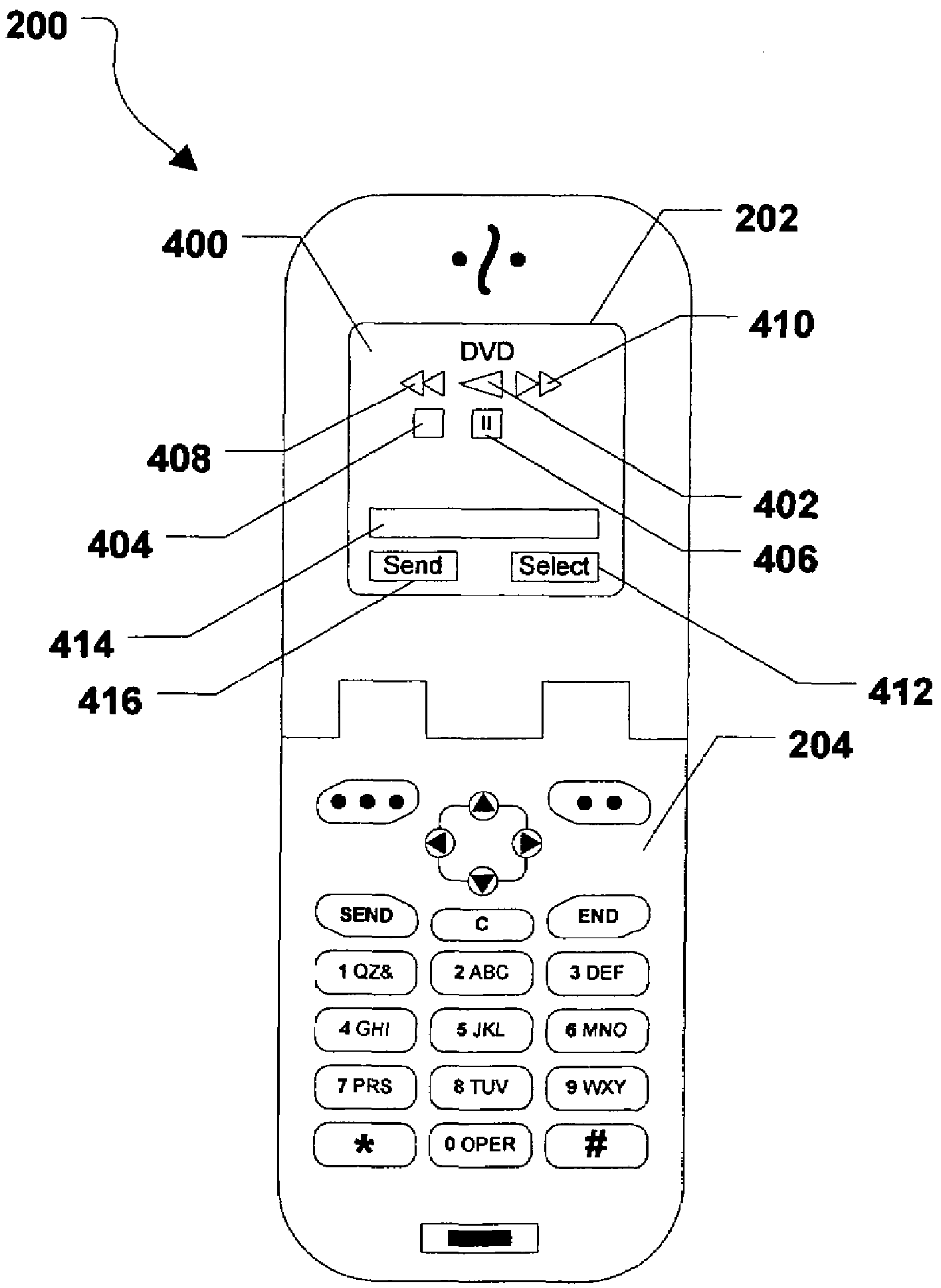
FIG. 4 is a general diagram of a home entertainment control system telephone with a third embodiment of a user interface.

FIG. 4 shows a DVD Player Control Interface, designated 400, that can be displayed at the HECS telephone 200 after DVD Player is selected at the device selection menu 206, shown in FIG. 2. As shown, the DVD Player Control Interface 400 can include a play button 402, a stop button 404, a pause button 406, a fast forward button 408, and a rewind button 410 that can be used to control the operation of a DVD that is loaded into a DVD player that is wirelessly linked to the HECS telephone 200. In an illustrative embodiment, a user can scroll through the control buttons 402, 404, 406, 408, 410 using the keypad 204 and then, using the keypad 204 or a soft button 412 that is labeled "Select," select a particular DVD player control button 402, 404, 406, 408, 412 in order to send a command associated with the particular DVD player control button 402, 404, 406, 408, 412 from the HECS telephone 200 to the DVD player.

FIG. 4 also shows that the DVD Player Control Interface 400 can include a text input field 414 and a send button 416. In a particular embodiment, a user can input a text control message to the text input field 414 using the keypad 204 and then, toggle the send button 416 in order to send a control message to the DVD player. In an exemplary embodiment, control commands can be sent from the HECS telephone 200 to the DVD player via RF signals, IR signals, or text messages.

In alternative embodiments, a Set Top Box Control Interface, an Audio Receiver Control Interface, a CD Player Control Interface, or an MP3 Player Control Interface can be presented to a user via the HECS telephone 200. In a particular embodiment, the Set Top Box Control Interface and the Audio Receiver Control Interface can include the same soft buttons and control commands as the Television Control Interface. Moreover, the CD Player Control Interface and the MP3 Player Control Interface can include the same soft buttons and control commands as the DVD Player Control Interface.

Figure 5:
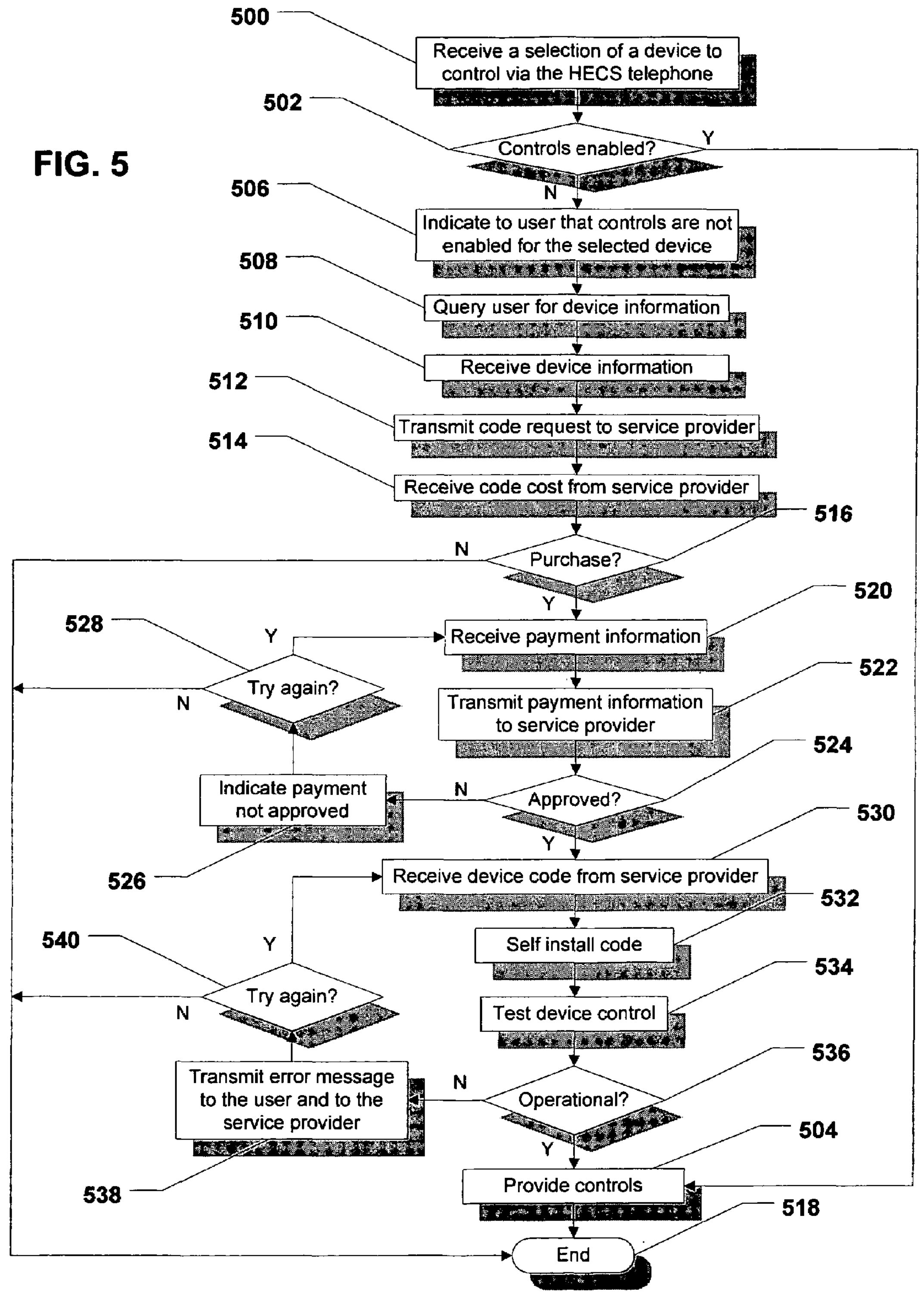
FIG. 5 is a flow chart to illustrate a method of controlling multiple devices via a home entertainment control system telephone.

FIG. 5 depicts a method of controlling multiple devices via an HECS telephone. Commencing at block 500, the HECS telephone receives a selection of a device to controlled using the HECS telephone. For example, the selected device can be a CD player, a DVD player, an audio receiver, an MP3 player, a set top box, or a television. Moving to decision step 502, the HECS telephone determines whether controls for the selected device are enabled at the HECS telephone. If so, the method proceeds to block, 504 and the appropriate electronic device controls are provided. In a particular embodiment, one of the user interfaces described above can be presented to the user at the HECS telephone and a user can control the selected device via the appropriate interface.

At decision step 502, if the controls are not enabled, the method moves to block 506 and the HECS telephone indicates to the user that the controls are not enabled for the selected device. Then, at block 508, the HECS telephone queries the user for device information, e.g., the model number of the device. At block 510, the HECS telephone receives the device information. Proceeding to block 512, the HECS telephone transmits a code request to a service provider, e.g., a telephone service provider. In a particular embodiment, the code request includes the device information. Further, in a particular embodiment, the service provider can use the device information to determine the code required to unlock the controls at the HECS telephone. The code request can be transmitted to the service provider via a PSTN or a wireless communications network.

Proceeding to block 514, the HECS telephone receives a cost of receiving the requested code from the service provider. Next, at decision step 516, the user is queried via the HECS telephone as to whether he or she would like to purchase the code. If not, the method ends at state 518. If the user would like to purchase the code, the HECS telephone receives payment information at block 520. Thereafter, at block 522, the HECS telephone transmits payment information to the service provider. Continuing to decision step 524, the service provider determines whether the payment is approved. If not, the method moves to block 526 and the HECS telephone indicates to the user that payment is not approved. Next, at decision step 528, the HECS telephone queries the user as to whether he or she would like to try again and submit new payment information to the service provider via the HECS telephone. If the user does not want to try again, the method ends at state 518. On the other hand, if the user does want to try again the method returns to block 520 and continues as described above.

Returning to decision step 524, if payment is approved, the method proceeds to block 530 and the HECS telephone receives the code from the service provider. Thereafter, at block 532, the HECS telephone self installs the code. Proceeding to block 534, the HECS telephone tests the device controls to determine whether the device code is correct and to verify that the HECS telephone can control the selected device. Moving to decision step 536, the HECS telephone determines whether the controls for the selected device are operational. If the controls are not operational, the method continues to block 538 and an error indication is transmitted to the user and the service provider.

Moving to decision step 540, the HECS telephone queries the user as to whether he or she would like to try again. If the user does not want to try again, the method ends at state 518. Conversely, if the user does want to try again, the method returns to block 530 and continues as described above. Returning to decision step 536, if the device controls are operational, the method proceeds to block 504 and the device controls associated with the particular device are provided and available for use at the HECS telephone. Then the method ends at state 518.

As described above, in a particular embodiment, particular device controls reside at the HECS telephone, e.g., within a computer readable medium. A code can be uploaded to the HECS telephone and processed in order to unlock the device controls, e.g., particular RF frequencies or IR frequencies that are linked to device functions. In another embodiment, a control program for a particular device can reside at the service provider and the control program can be uploaded to the HECS telephone in lieu of a code. In such an embodiment, the control program can include the particular soft buttons associated with the controls provided and the frequencies for each control.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A portable communication device, comprising:

a display;

a keypad; and a plurality of remote control soft buttons presented at the display, wherein an electronic device control command is associated with at least one remote control soft button of the plurality of remote control soft buttons, wherein scrolling through the plurality of remote control soft buttons is enabled via the keypad, wherein selection of the at least one remote control soft button of the plurality of remote control soft buttons is enabled via the keypad, wherein an indication that a selected device is not enabled is presented and wherein a query to provide a model number of the selected device is presented and wherein a cost to purchase a device code is received from a service provider; and wherein the electronic device control command is enabled in response to the device code received at the portable communication device from the service provider.

2. The portable communication device of claim 1, wherein the portable communication device includes a cordless telephone and is adapted to communicate with a cordless telephone base station, and wherein the portable communication device is further adapted to be charged by the cordless telephone base station when seated in a cradle of the cordless telephone base station.

3. The portable communication device of claim 1, wherein the at least one electronic device control command is selected from the group consisting of: play, stop, pause, volume up, volume down, record, channel up, channel down, fast forward, and rewind.

4. The portable communication device of claim 1, further comprising a text input field and a send button presented at the display.

5. The portable communication device of claim 1, wherein the portable communication device selectively controls a selected remote electronic device using the at least one electronic device control command.

6. The portable communication device of claim 5, wherein the selected remote electronic device is selected from the group consisting of: a digital video disc player, a compact disc player, a television, an MP3 player, an audio receiver, and a set top box.

7. The portable communication device of claim 5, further comprising a radio frequency transceiver, wherein the portable communication device communicates the at least one electronic device control command to the selected electronic device via the radio frequency transceiver.

8. The portable communication device of claim 5, further comprising an infrared transceiver, wherein the portable communication device communicates the at least one electronic device control command to the selected electronic device via the infrared transceiver.

9. The portable communication device of claim 5, further comprising a short message system module, wherein the portable communication device communicates the at least one electronic device control command to the selected electronic device via the short message system module.

10. A method of controlling a remote electronic device, comprising:

receiving a selection of the remote electronic device at a portable communication device, the portable communication device adapted to communicate voice data and text message data to a public switched telephone network via a base station, the portable communication device further adapted to be charged when cradled at the base station;

determining whether a control interface corresponding to the electronic device is enabled at the portable communication device, wherein upon a determination that the control interface is not enabled an indication that the control interface is not enabled is presented and a query for a model number of the electronic device is presented;

transmitting a request to a service provider for a device code associated with activating the control interface; and receiving a cost to purchase the device code from the service provider.

11. The method of claim 10, further comprising receiving the device code.

12. The method of claim 11, further comprising unlocking control of the electronic device in response to receiving the device code at the portable communication device.

13. The method of claim 10, further comprising transmitting payment information to the service provider via the portable communication device.

14. The method of claim 12, further comprising sending a control command from the portable communication device to the remote electronic device via one or more radio frequency signals.

15. The method of claim 12, further comprising sending a control command from the portable communication device to the remote electronic device via one or more infrared signals.

16. The method of claim 12, further comprising sending a control command from the portable communication device to the remote electronic device via one or more text messages.

17. The method of claim 10, wherein the portable communication device communicates with the service provider via a public switched portable communication device network.

18. The method of claim 10, wherein the portable communication device communicates with the service provider via a wireless communications network.

19. A user interface displayed on a display area of a portable communication device, the user interface comprising:

a selectable list of electronic devices that are remotely controllable via soft buttons at a display of the portable communication device, wherein the soft buttons are navigable and selectable via a keypad of the portable communication device, the portable communication device adapted to communicate voice and text data to a public telephone network via a base station, the portable communication device further adapted to be charged when cradled at the base station, wherein after an electronic device is selected, the user interface presents an indication that the electronic device is not enabled and presents a query for a model number of the electronic device and the user interface presents a query regarding a device code associated with the electronic device to enable control of the electronic device; and wherein a cost to purchase the device code is received via the public telephone network.

20. The user interface of claim 19, further comprising an electronic device control interface associated with at least one of the electronic devices identified on the list.

21. The user interface of claim 20, wherein the electronic device control interface is presented after the at least one electronic device is selected from the list of electronic devices.

22. The user interface of claim 21, wherein the electronic device control interface comprises a control icon associated with a function of the at least one electronic device.

23. The user interface of claim 22, wherein the electronic device control interface further comprises a text input field and a send button.

24. The user interface of claim 23, wherein the electronic device is selected from the group consisting of: a digital video disc player, a compact disc player, a television, an MP3 player, an audio receiver, and a set top box.

25. The user interface of claim 22, wherein the control icon is selected from the group consisting of: play, stop, pause, volume up, volume down, record, channel up, channel down, fast forward, and rewind.

* * * * *